US012391047B2

(12) United States Patent
Yano et al.

(10) Patent No.: US 12,391,047 B2
(45) Date of Patent: Aug. 19, 2025

(54) INKJET RECORDING APPARATUS

(71) Applicant: KYOCERA Document Solutions Inc., Osaka (JP)

(72) Inventors: Yuko Yano, Osaka (JP); Hiroomi Nakatsuji, Osaka (JP); Jun Nakano, Osaka (JP); Issei Nakano, Osaka (JP); Takashi Somete, Osaka (JP); Chikara Ishihara, Osaka (JP); Noriaki Furukawa, Osaka (JP); Takuma Araki, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 213 days.

(21) Appl. No.: 18/553,683

(22) PCT Filed: Mar. 25, 2022

(86) PCT No.: PCT/JP2022/014462
§ 371 (c)(1),
(2) Date: Oct. 2, 2023

(87) PCT Pub. No.: WO2022/215552
PCT Pub. Date: Oct. 13, 2022

(65) Prior Publication Data

US 2024/0198683 A1 Jun. 20, 2024

(30) Foreign Application Priority Data

Apr. 7, 2021 (JP) ................................ 2021-065053

(51) Int. Cl.

| | |
|---|---|
| ***B41J 2/17*** | (2006.01) |
| ***B41J 2/165*** | (2006.01) |
| ***B41J 2/21*** | (2006.01) |

(52) U.S. Cl.
CPC ........... *B41J 2/1714* (2013.01); *B41J 2/1652* (2013.01); *B41J 2/16552* (2013.01);
(Continued)

(58) Field of Classification Search
CPC .... B41J 2/1714; B41J 2/1652; B41J 2/16552; B41J 2/1707; B41J 2/1721; B41J 2/2103;
(Continued)

(56) References Cited

U.S. PATENT DOCUMENTS

| | | | | |
|---|---|---|---|---|
| 6,220,314 | B1 | 4/2001 | Sato | 141/351 |
| 2010/0231676 | A1 | 9/2010 | Miyagi | 347/104 |

(Continued)

FOREIGN PATENT DOCUMENTS

| | | |
|---|---|---|
| JP | 2000-127453 A | 5/2000 |
| JP | 2009-073002 A | 4/2009 |

(Continued)

*Primary Examiner* — Justin Seo
(74) *Attorney, Agent, or Firm* — Stein IP LLC

(57) ABSTRACT

An inkjet recording apparatus includes a recording head, a conveyance belt, a control portion, an ink receiver, an ink discharging flow path, and a liquid supply mechanism. The recording head includes a plurality of nozzles for ejecting ink. The conveyance belt has a plurality of first openings and conveys a recording medium. The control portion executes flushing in which the ink is ejected through the nozzles of the recording head to pass through any of the plurality of first openings. The ink receiver is opposite disposed to be opposed to the recording head via the conveyance belt and receives the ink that has passed through the first openings during execution of the flushing. The ink discharging flow path is connected to the ink receiver. The liquid supply mechanism supplies a liquid capable of dissolving the ink into the ink receiver.

7 Claims, 10 Drawing Sheets

(52) U.S. Cl.
CPC ........... *B41J 2/1707* (2013.01); *B41J 2/1721* (2013.01); *B41J 2/2103* (2013.01); *B41J 2/16585* (2013.01); *B41J 2002/16591* (2013.01); *B41J 2002/16594* (2013.01)

(58) Field of Classification Search
CPC .......... B41J 2/16585; B41J 2002/16591; B41J 2002/16594
See application file for complete search history.

(56) References Cited

U.S. PATENT DOCUMENTS

| | | | | |
|---|---|---|---|---|
| 2011/0227980 | A1 | 9/2011 | Saitoh et al. | 347/14 |
| 2022/0305791 | A1* | 9/2022 | Somete | B41J 2/16514 |

FOREIGN PATENT DOCUMENTS

| | | | |
|---|---|---|---|
| JP | 2009-143161 | A | 7/2009 |
| JP | 2010-167586 | A | 8/2010 |
| JP | 2010-241109 | A | 10/2010 |
| JP | 2011-213095 | A | 10/2011 |
| JP | 2013-188927 | A | 9/2013 |

* cited by examiner

INKJET RECORDING APPARATUS

CROSS-REFERENCE TO RELATED APPLICATIONS

This application is a national stage of International Application No. PCT/JP2022/014462, filed Mar. 25, 2022, which claims the benefit of Japanese Application No. 2021-065053, filed Apr. 7, 2021, in the Japanese Patent Office, the disclosures of which are incorporated herein by reference.

TECHNICAL FIELD

The present invention relates to an inkjet recording apparatus.

BACKGROUND ART

Conventionally, in an inkjet recording apparatus such as an inkjet printer, in order to reduce or prevent clogging of nozzles due to drying of ink, flushing (idle ejection) is performed in which the ink is periodically ejected through the nozzles. For example, in an inkjet recording apparatus described in Patent Document 1, a conveyance belt that conveys a recording medium has openings provided therein, and ink is ejected through nozzles of a recording head to pass through the openings of the conveyance belt.

In the inkjet recording apparatus described above, the ink that has passed through the openings of the conveyance belt as a result of the flushing normally arrives on an ink receiver that receives the ink and is collected to be discharged as a waste liquid from the ink receiver. The ink arriving on the ink receiver, however, often becomes dried to have decreased flowability. The ink having the decreased flowability is deposited on the ink receiver and adheres to the conveyance belt, causing the recording medium to be contaminated. Furthermore, solidified ink causes clogging of an ink discharging flow path, resulting in contamination inside the apparatus or a breakdown of the apparatus.

There are disclosed methods for improving efficiency in collecting ejected ink as follows. For example, Patent Document 2 discloses an image forming apparatus in which an idle ejection receiver is provided so as to be inclinable with respect to an ejection direction of idle ejection droplets ejected from a recording head toward openings of a conveyance belt, and when a flying direction of the idle ejection droplets is bent, the idle ejection receiver is also inclined so as to reduce a phenomenon in which the droplets land at a position shifted to one side.

Furthermore, Patent Document 3 discloses an inkjet recording apparatus in which a fixed plate is provided along a circumferential surface of a conveyance belt in an inner circumferential region of the conveyance belt, the fixed plate has an opening formed at a position thereon corresponding to ink spraying nozzles and an air suction through-hole formed therein, and an idle ejection ink receiver is provided in tight contact with the fixed plate with no gap therebetween so that an internal space of the idle ejection ink receiver is an enclosed space except for an opening thereof corresponding to the opening of the fixed plate.

CITATION LIST

Patent Literature

Patent Document 1: Japanese Unexamined Patent Application Publication No. 2011-213095

Patent Document 2: Japanese Unexamined Patent Application Publication No. 2010-167586

Patent Document 3: Japanese Unexamined Patent Application Publication No. 2010-241109

SUMMARY OF INVENTION

Technical Problem

In each of the methods described in Patent Documents 2 and 3, while it is possible for ejected ink to reliably arrive on the ink receiver, drying and a decrease in flowability of the ink that has arrived on the ink receiver cannot be suppressed.

In view of the above-described problem, it is an object of the present invention to provide an inkjet recording apparatus capable of suppressing drying and a decrease in flowability of ink that has arrived on an ink receiver as a result of flushing.

Solution to Problem

In order to achieve the above-described object, a first configuration of the present invention relates to an inkjet recording apparatus including a recording head, a conveyance belt, a control portion, an ink receiver, an ink discharging flow path, and a liquid supply mechanism. The recording head includes a plurality of nozzles for ejecting ink. The conveyance belt has a plurality of first openings and conveys a recording medium. The control portion controls driving of the recording head and the conveyance belt so as to execute flushing in which, at a timing different from a timing contributing to image recording, the ink is ejected through the nozzles of the recording head to pass through any of the plurality of first openings. The ink receiver is disposed to be opposed to the recording head via the conveyance belt and receives the ink that has passed through the first openings during execution of the flushing. The ink discharging flow path is connected to the ink receiver. The liquid supply mechanism supplies a liquid capable of dissolving the ink into the ink receiver.

Advantageous Effects of Invention

According to the first configuration of the present invention, the liquid supply mechanism is used to supply the liquid capable of dissolving the ink into the ink receiver so that residual ink remaining in the ink receiver is washed away, and thus it is possible to efficiently collect ink that has become dried on the ink receiver and thus has decreased flowability. Accordingly, it is possible to suppress contamination of the recording medium and the conveyance belt due to deposition of the ink on the ink receiver and clogging of the ink discharging flow path.

DESCRIPTION OF EMBODIMENTS

1. Configuration of Inkjet Recording Apparatus

Figure 1:
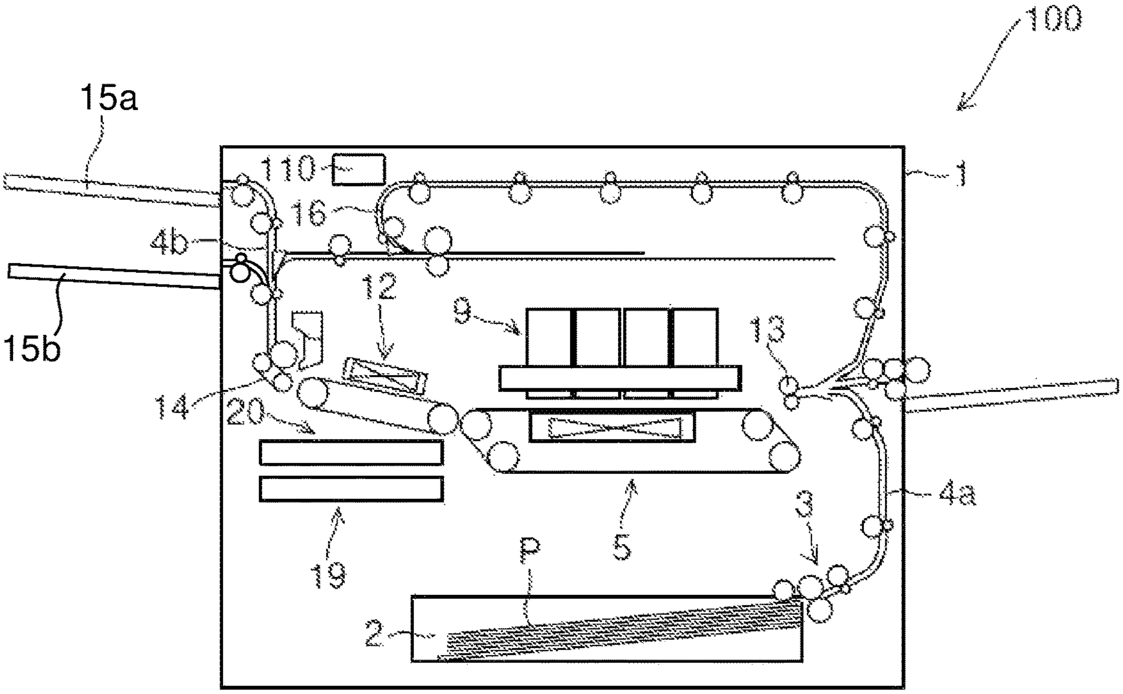
FIG. 1 is an explanatory view showing a schematic configuration of a printer as an inkjet recording apparatus according to an embodiment of the present invention.

With reference to the appended drawings, the following describes embodiments of the present invention. FIG. 1 is an explanatory view showing a schematic configuration of a printer 100 as an inkjet recording apparatus according to an embodiment of the present invention. The printer 100 includes a paper feed cassette 2 that is a sheet housing portion. The paper feed cassette 2 is disposed on a lower side in a printer main body 1. A sheet P that is an example of a recording medium is housed in the paper feed cassette 2.

A paper feed device 3 is disposed on a downstream side of the paper feed cassette 2 in a sheet conveyance direction, i.e., at an upper right part of the paper feed cassette 2 in FIG. 1. By the paper feed device 3, the sheet P is fed out one by one separately toward an upper right side of the paper feed cassette 2 in FIG. 1.

The printer 100 includes therein a first sheet conveyance path 4*a*. With respect to the paper feed cassette 2, the first sheet conveyance path 4*a* is positioned on the upper right side, which corresponds to a paper feed direction of the paper feed cassette 2. Via the first sheet conveyance path 4*a*, the sheet P fed out from the paper feed cassette 2 is conveyed vertically upward along a side surface of the printer main body 1.

A registration roller pair 13 is provided at a downstream end of the first sheet conveying path 4*a* in the sheet conveyance direction. Moreover, a first conveyance unit 5 and a recording portion 9 are disposed in immediate proximity to a downstream part of the registration roller pair 13 in the sheet conveyance direction. The sheet P fed out from the paper feed cassette 2 passes through the first sheet conveyance path 4*a* to reach the registration roller pair 13. While correcting oblique feeding of the sheet P, the registration roller pair 13 feeds out the sheet P toward the first conveyance unit 5 (particularly, an after-mentioned first conveyance belt 8) in synchronization with an ink ejection operation executed by the recording portion 9.

The sheet P fed out to the first conveyance unit 5 by the registration roller pair 13 is conveyed to an opposed position to the recording portion 9 (particularly, after-mentioned recording heads 17*a* to 17*c*) by the first conveyance belt 8. Ink is ejected from the recording portion 9 to the sheet P so that an image is recorded thereon. At this time, ejection of the ink in the recording portion 9 is controlled by a control device 110 in the printer 100.

A second conveyance unit 12 is disposed on a downstream side of the first conveyance unit 5 in the sheet conveyance direction (a left side in FIG. 1). The sheet P on which the image has been recorded by the recording portion 9 is sent to the second conveyance unit 12. The ink ejected to a surface of the sheet P is dried while the sheet P passes through the second conveyance unit 12.

A decurler portion 14 is provided on a downstream side of the second conveyance unit 12 in the sheet conveyance direction and in a neighborhood of a left side surface of the printer main body 1. The sheet P on which the ink has been dried by the second conveyance unit 12 is sent to the decurler portion 14 where a curl generated in the sheet P is corrected.

A second sheet conveyance path 4*b* is provided on a downstream side of the decurler portion 14 in the sheet conveyance direction (an upper side in FIG. 1). When duplex recording is not performed, the sheet P that has passed through the decurler portion 14 passes through the second sheet conveyance path 4*b* to be discharged onto a sheet discharge tray 15*a* provided outside a left side surface of the printer 100. Below the sheet discharge tray 15*a*, there is provided a sub-discharge tray 15*b* onto which, as the sheet P, a sheet (a waste sheet) on which a printing failure or the like has occurred is discharged.

An inversion conveyance path 16 for performing duplex recording is provided in an upper part of the printer main body 1 and above the recording portion 9 and the second conveyance unit 12. When duplex recording is performed, the sheet P that has passed through the second conveyance unit 12 and the decurler portion 14 after completion of recording on one side (a first side) thereof passes through the second sheet conveyance path 4*b* to be sent to the inversion conveyance path 16.

The conveyance direction for conveying the sheet P sent to the inversion conveyance path 16 is switched for subsequent recording on the other side (a second side) of the sheet P. Then, the sheet P passes through the upper part of the printer main body 1 to be sent rightward and is further sent, with the second side up, again to the first conveyance unit 5 via the registration roller pair 13. In the first conveyance unit 5, the sheet P is conveyed to the opposed position to the recording portion 9, and the ink is ejected from the recording portion 9 thereto so that an image is recorded on the second side. The sheet P after being subjected to the duplex recording sequentially passes through the second conveyance unit 12, the decurler portion 14, and the second sheet conveyance path 4*b* to be discharged onto the sheet discharge tray 15*a*.

Furthermore, a maintenance unit 19 and a cap unit 20 are disposed below the second conveyance unit 12. When executing purging, the maintenance unit 19 horizontally moves to below the recording portion 9 to wipe off the ink extruded through ink ejection ports of each of recording heads and to collect the ink thus wiped off. The purging refers to an operation of forcibly extruding the ink through the ink ejection ports of each the recording heads so as to discharge thickened ink, foreign matter, and air bubbles in the ink ejection ports. When capping ink ejection surfaces of the recording heads, the cap unit 20 horizontally moves to below the recording portion 9 and further moves upward so as to be attached to lower surfaces of the recording heads.

Figure 2:
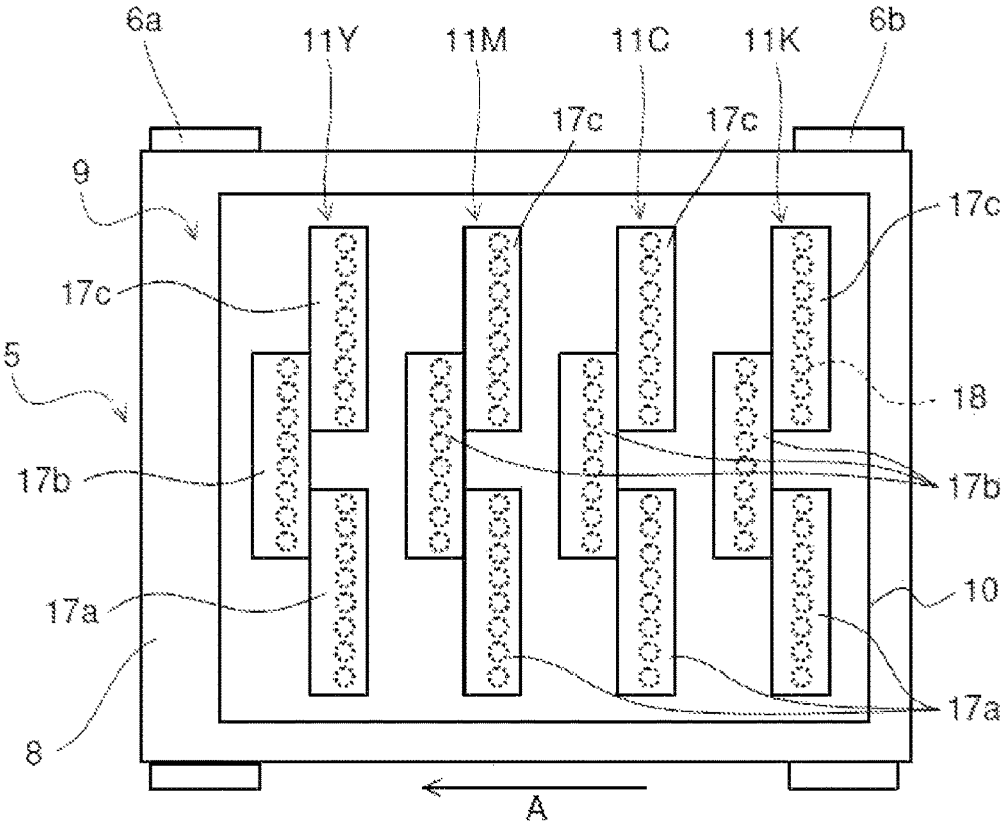
FIG. 2 is a plan view of a recording portion included in the above-described printer.

FIG. 2 is a plan view of the recording portion 9. The recording portion 9 includes a head housing 10 and line heads 11Y, 11M, 11C, and 11K. In the head housing 10, the line heads 11Y to 11K are held at a prescribed distance (for example, 1 mm) in level from a conveyance surface of the first conveyance belt 8, which is an endless belt stretched over a plurality of rollers including a driving roller 6*a*, a driven roller 6*b*, and tension rollers 7*a* and 7*b* (see FIG. 7). The driving roller 6*a* causes the first conveyance belt 8 to travel in the conveyance direction for conveying the sheet P (an arrow A direction). Driving of the driving roller 6*a* is controlled by a main control portion 110*a* (see FIG. 8) of the control device 110. The above-described plurality of rollers are disposed along a travelling direction of the first conveyance belt 8 in an order of the tension roller 7*a*, the tension roller 7*b*, the driven roller 6*b*, and the driving roller 6*a* (see FIG. 7).

The line heads 11Y to 11K each include the plurality of (herein, three) recording heads 17*a* to 17*c*. The recording heads 17*a* to 17*c* are arrayed in a staggered manner along an intersecting direction intersecting the sheet conveyance direction (the arrow A direction). In this embodiment, the intersecting direction is identical to a sheet width direction (an arrow B-B' direction) orthogonal to the sheet conveyance direction (the arrow A direction). The recording heads 17*a* to 17*c* each have a plurality of ink ejection ports 18 (nozzles). The ink ejection ports 18 are arranged at equal intervals in the intersecting direction (the arrow B-B' direction). From the line heads 11Y to 11K, ink of respective colors of yellow (Y), magenta (M), cyan (C), and black (K) is ejected through the ink ejection ports 18 of the recording heads 17*a* to 17*c* toward the sheet P being conveyed on the first conveyance belt 8.

Figure 3:
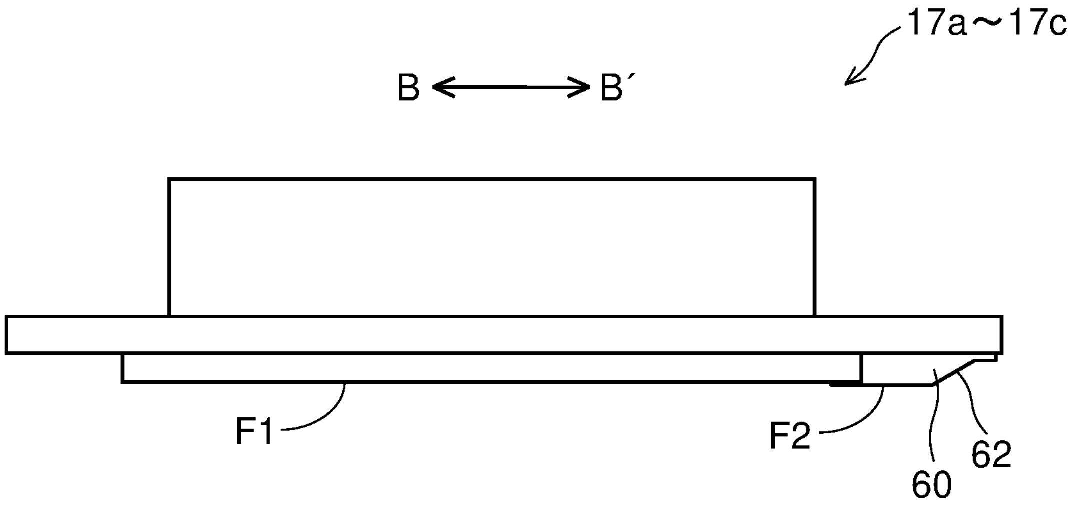
FIG. 3 is a side view of each of recording heads constituting each of line heads in the recording portion.
Figure 4:
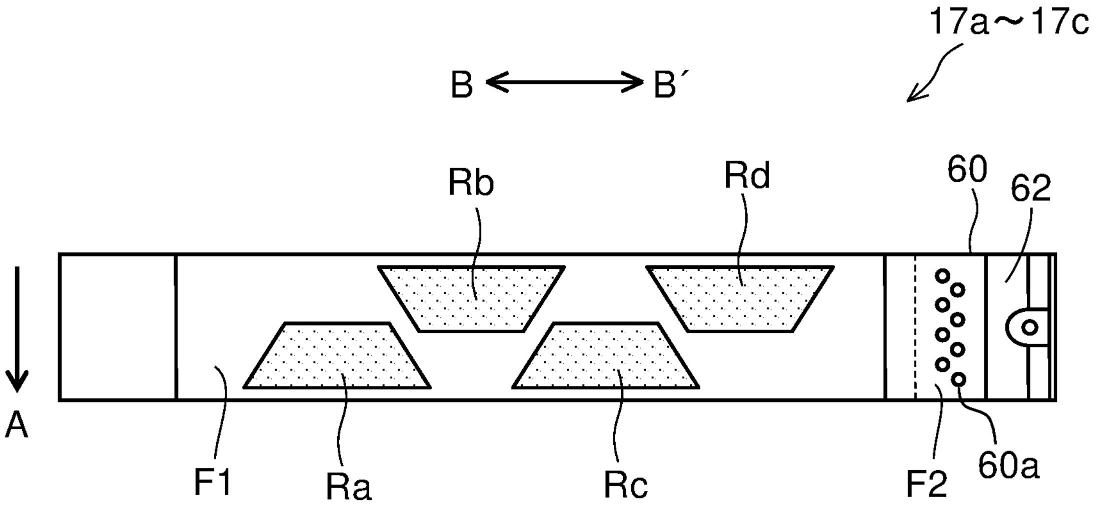
FIG. 4 is a plan view of the each of recording heads as viewed from an ink ejection surface side thereof.
Figure 5:
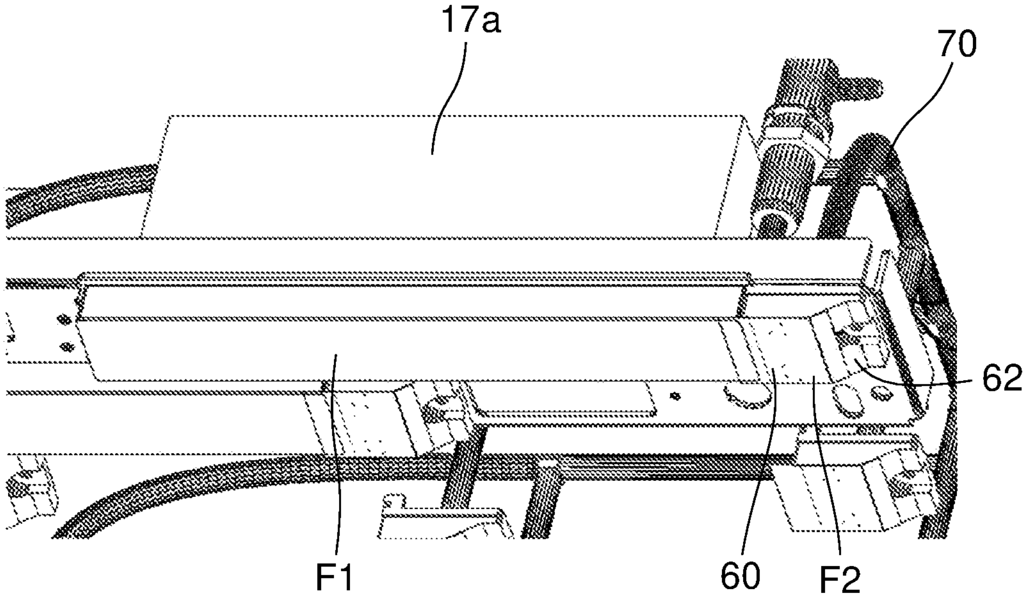
FIG. 5 is a perspective view of a vicinity of one of the recording heads as viewed from diagonally below.
Figure 6:
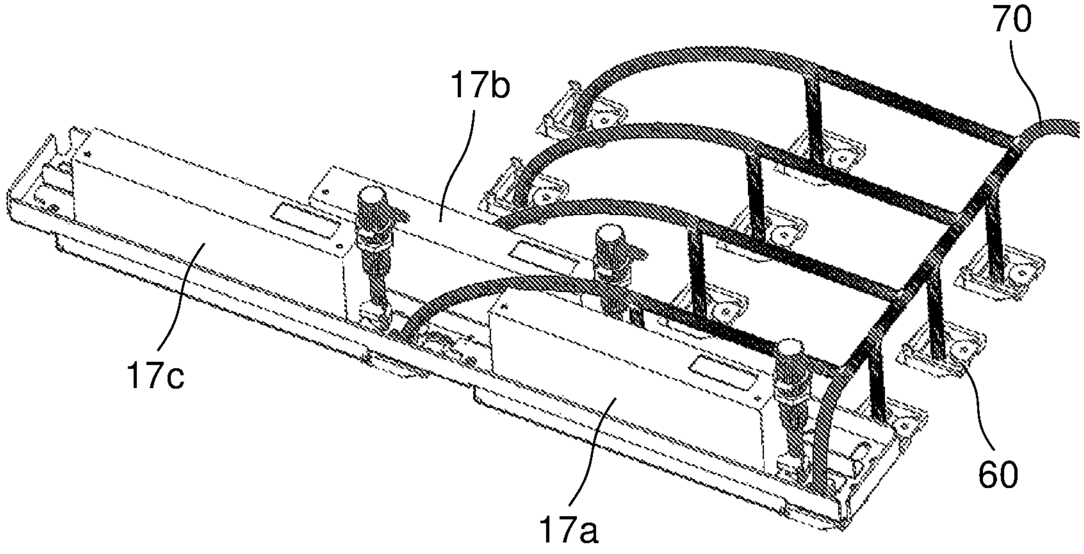
FIG. 6 is a perspective view of a vicinity of one of the recording heads as viewed from diagonally above.

FIG. 3 is a side view of each of the recording heads 17*a* to 17*c* constituting each of the line heads 11Y to 11K in the recording portion 9, FIG. 4 is a plan view of the each of the recording heads 17*a* to 17*c* as viewed from an ink ejection surface F1 side thereof, FIG. 5 is a perspective view of a vicinity of the recording head 17*a* as viewed from diagonally below, and FIG. 6 is a perspective view of a vicinity of the recording head 17*a* as viewed from diagonally above. Since the recording heads 17*a* to 17*c* are identical in shape and configuration, FIG. 3 and FIG. 4 show a single recording head as each of the recording heads 17*a* to 17*c*. As shown in FIG. 3 and FIG. 4, on an ink ejection surface (nozzle surface) F1 of each of the recording heads 17*a* to 17*c*, there are provided a plurality of (herein, four blocks of) nozzle regions Ra to Rd in which the multitude of ink ejection ports 18 (see FIG. 2) are arrayed. The ink ejection surface F1 is made of, for example, SUS (stainless steel).

The recording heads 17*a* to 17*c* constituting each of the line heads 11Y to 11K are supplied with ink of four different colors (cyan, magenta, yellow, and black) stored in ink tanks (not shown) so as to correspond to respective colors of the line heads 11Y to 11K.

Based on a control signal from the control device 110 (see FIG. 8), in accordance with image data received from an external computer, the recording heads 17*a* to 17*c* eject the ink through the ink ejection ports 18 toward the sheet P being conveyed while being absorbed to the conveyance surface of the first conveyance belt 8. Thus, on the sheet P on the first conveyance belt 8, there is formed a color image in which the four different colors, which are cyan, magenta, yellow, and black, of ink are superimposed on each other. Furthermore, a cleaning liquid supply part 60 that supplies a cleaning liquid is provided at one end of each of the recording heads 17*a* to 17*c* in a longitudinal direction thereof (the arrow B-B' direction) orthogonal to the sheet conveyance direction (the arrow A direction). The cleaning liquid supply part 60 has a multitude of cleaning liquid supply ports 60*a* formed therein.

As shown in FIG. 5 and FIG. 6, a downstream end of a supply path 70 formed of a tube for passing the cleaning liquid therethrough is connected to the cleaning liquid supply part 60. An upstream end of the supply path 70 is connected to a cleaning liquid supply mechanism (not shown). The cleaning liquid supply mechanism is composed of a tank (not shown) for containing the cleaning liquid and a pumping-up pump (not shown) that pumps up the cleaning liquid from the tank to the supply path 70.

The supply path 70, while being a single path at the upstream end thereof, repeatedly branches off toward a downstream side into 12 partial paths. The 12 paths are each connected to the cleaning liquid supply part 60 of each of the recording heads 17*a* to 17*c* constituting each of the line heads 11Y to 11K.

In the printer 100, in order to clean the ink ejection surface F1 of each of the recording heads 17*a* to 17*c*, at a start of printing after long-term non-operation and between printing operations, in preparation for a subsequent printing operation, there is executed a recovery operation of the recording heads 17*a* to 17*c* in which the ink is extruded (purged) through the ink ejection ports 18 of all the recording heads 17*a* to 17*c*, the cleaning liquid is supplied to a cleaning liquid supply surface F2 through the cleaning liquid supply ports 60*a*, and together with the cleaning liquid, the ink ejected to the ink ejection surface F1 is wiped off by a wiper (not shown). The ink and the cleaning liquid wiped off from the ink ejection surface F1 are collected by after-mentioned ink receivers 31Y to 31K (see FIG. 7).

Figure 7:
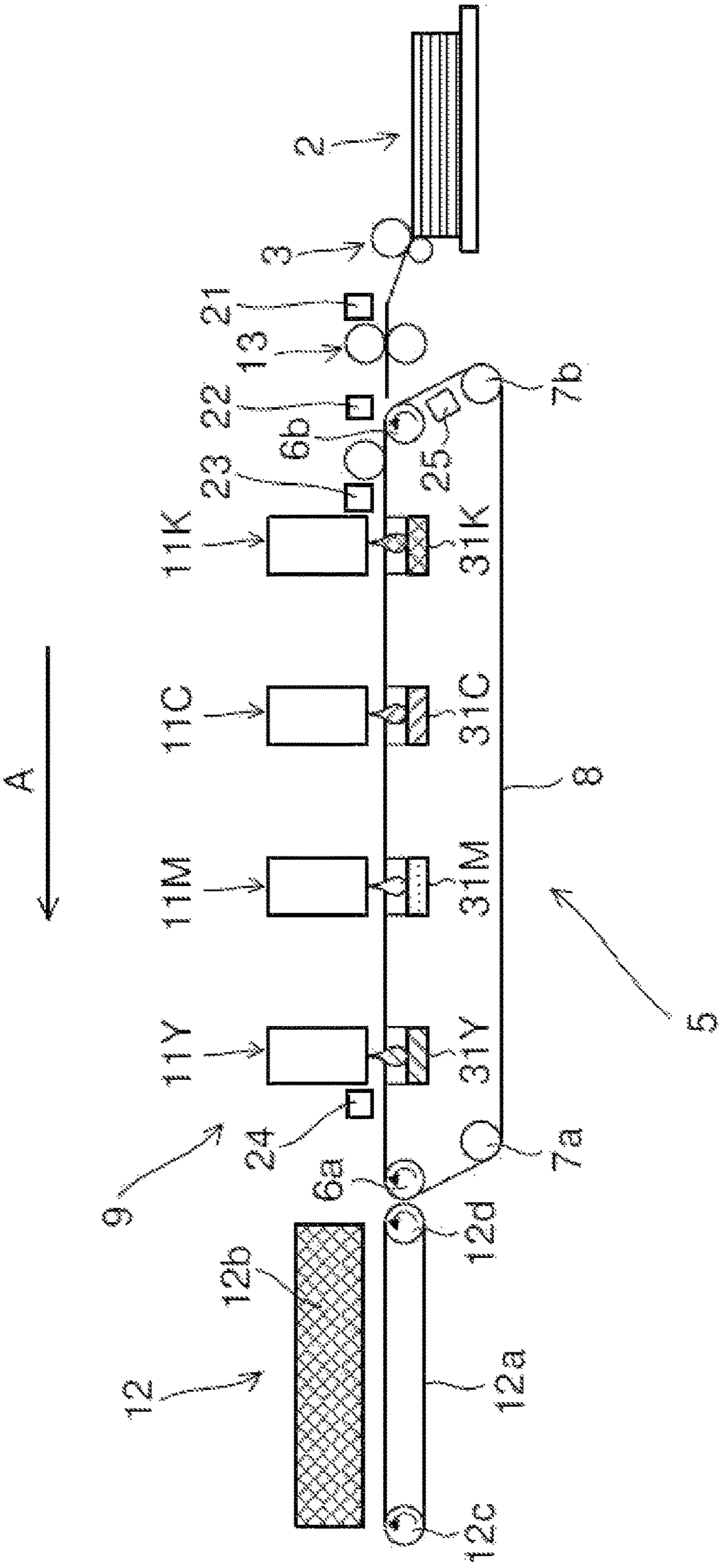
FIG. 7 is an explanatory view schematically showing a configuration in a vicinity of a conveyance path along which a sheet is conveyed from a paper feed cassette to a second conveyance unit via a first conveyance unit in the above-described printer.
Figure 8:
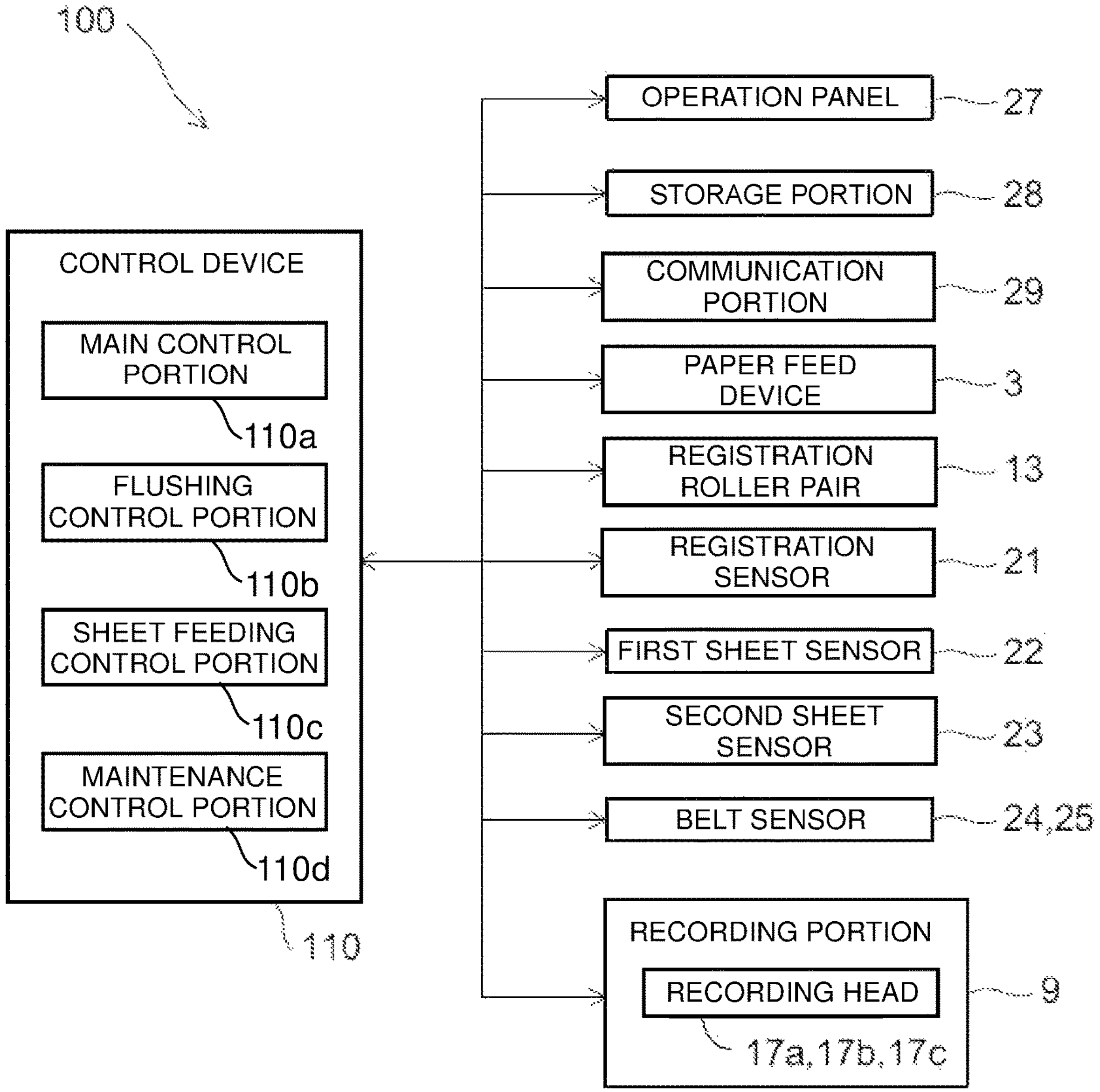
FIG. 8 is a block diagram showing a hardware configuration of a main part of the above-described printer.

FIG. 7 schematically shows a configuration in a vicinity of a conveyance path along which the sheet P is conveyed from the paper feed cassette 2 to the second conveyance unit 12 via the first conveyance unit 5. Furthermore, FIG. 8 is a block diagram showing a hardware configuration of a main part of the printer 100. In addition to the above-described configuration, the printer 100 further includes a registration sensor 21, a first sheet sensor 22, a second sheet sensor 23, and belt sensors 24 and 25.

The registration sensor 21 detects the sheet P being conveyed by the paper feed device 3 from the paper feed cassette 2 to the registration roller pair 13. The registration sensor 21 is positioned on an upstream side relative to the registration roller pair 13 in a feeding direction of the sheet P. Based on a result of the detection by the registration sensor 21, the control device 110 (for example, a sheet feeding control portion 110*c*) controls a timing for starting rotation of the registration roller pair 13. For example, based on a result of the detection by the registration sensor 21, the control device 110 controls a timing for feeding, to the first conveyance belt 8, the sheet P that has been subjected to skew (oblique feed) correction by the registration roller pair 13.

The first sheet sensor 22 detects a position of the sheet P in the width direction thereof, which is being sent from the registration roller pair 13 to the first conveyance belt 8. Based on a result of the detection by the first sheet sensor 22, the control device 110 (for example, the main control portion 110*a*) can perform control in which the ink is ejected through, among the ink ejection ports 18 of the recording heads 17*a* to 17*c* of each of the line heads 11Y to 11K, a set of ink ejection ports 18 corresponding to a width of the sheet P so that an image is recorded on the sheet P.

The second sheet sensor 23 detects passing of the sheet P fed to the first conveyance belt 8 by the registration roller pair 13. That is, the second sheet sensor 23 detects a position of the sheet P in the conveyance direction, which is being conveyed on the first conveyance belt 8. The second sheet sensor 23 is positioned on an upstream side of the recording portion 9 and on a downstream side of the first sheet sensor 22 in the sheet conveyance direction. Based on a result of the detection by the second sheet sensor 23, the control device 110 (for example, the main control portion 110*a*) can control a timing for ejecting the ink to the sheet P being conveyed to reach the position opposed to the line heads 11Y to 11K (the recording heads 17*a* to 17*c*) by the first conveyance belt 8.

The belt sensors 24 and 25 are each a reference detection sensor that detects a reference specifying area Mref (see FIG. 9) provided on the first conveyance belt 8. The reference specifying area Mref is a reference area for identifying every full revolution of the first conveyance belt 8 and, as will be described later, is formed of a combination of two adjacent ones of opening groups 82. As will be described later, since a positional relationship between the reference specifying area Mref and other first openings 80 (opening groups 82) is previously known, when the belt sensors 24 and 25 detect the reference specifying area Mref on the first conveyance belt 8, based on a position of the reference specifying area Mref thus detected, there can be detected respective positions of the openings 80 (the opening groups 82) provided in the first conveyance belt 8 in the conveyance direction. Accordingly, it can be said that the belt sensors 24 and 25 each function as an opening position detecting portion that detects the respective positions of the first openings 80 of the first conveyance belt 8.

A configuration may also be adopted in which, at an end of the first conveyance belt 8 in a belt width direction thereof, marks are formed beforehand at positions corresponding to the opening groups 82, and the belt sensors 24 and 25 detect the above-described marks, thus detecting the respective positions of the opening groups 82 (the first openings 80) corresponding to the above-described marks.

The belt sensor 24 is positioned on a downstream side of the recording portion 9 in the sheet conveyance direction (the travelling direction of the first conveyance belt 8). In the sheet conveyance direction, the belt sensor 25 is positioned on an upstream side relative to the driven roller 6*b* over which the first conveyance belt 8 is stretched. While in this embodiment, the belt sensor 25 is positioned between the driven roller 6*b* and the tension roller 7*b*, the belt sensor 25 may be positioned between the tension roller 7*a* and the roller 7*b*. The driven roller 6*b* is positioned on an upstream side with respect to the recording portion 9 in the travelling direction of the first conveyance belt 8. The belt sensor 24 also has a function equivalent to that of the second sheet sensor 23. Based on a result of the detection by the belt sensor 24 or 25, the control device 110 (for example, the sheet feeding control portion 110*c*) can control the registration roller pair 13 to feed the sheet P to the first conveyance belt 8 at a prescribed timing.

Furthermore, a position of the sheet P is detected by the plurality of sensors (the second sheet sensor 23, the belt sensor 24), and the reference specifying area Mref on the first conveyance belt 8 is detected by the plurality of sensors (the belt sensors 24 and 25), and thus it also becomes possible to correct an error of the position thus detected or to detect an abnormality.

The first sheet sensor 22, the second sheet sensor 23, and the belt sensors 24 and 25, which are described above, may be each formed of a transmissive or reflective optical sensor, a CIS (contact image sensor), or the like.

In addition, the printer 100 may have a configuration including a meandering detection sensor that detects meandering of the first conveyance belt 8, in which based on a result of the detection thereby, the meandering of the first conveyance belt 8 is corrected.

Furthermore, the printer 100 further includes an operation panel 27, a storage portion 28, and a communication portion 29.

The operation panel 27 is an operation portion for accepting inputs of various settings. For example, by operating the operation panel 27, a user can input information on a size of the sheet P placed in the paper feed cassette 2, namely, a size of the sheet P to be conveyed by the first conveyance belt 8. Furthermore, by operating the operation panel 27, a user can also input the number of the sheets P to be printed or provide an instruction to start a printing job. Furthermore, the operation panel 27 also has a function as a notification device that provides a notification about an operation status (image recording or after-mentioned flushing) of the printer 100.

The storage portion 28 is a memory storing an operation program for the control device 110 and also storing various types of information and is configured by including a ROM (read-only memory), a RAM (random-access memory), a non-volatile memory, and so on. Information (for example, the information on the size of the sheet P or the number of sheets P) set via the operation panel 27 is stored in the storage portion 28.

The communication portion 29 is a communication interface for transmitting and receiving information between itself and an external device (for example, a personal computer (PC)). For example, when a user operates a PC to transmit a printing command together with image data to the printer 100, the image data and the printing command, which are described above, are inputted to the printer 100 via the communication portion 29. In the printer 100, based on the above-described image data, the main control portion 110*a* can control the recording heads 17*a* to 17*c* to eject the ink so that an image is recorded on the sheet P.

Furthermore, the printer 100 of this embodiment includes the control device 110. The control device 110 is configured by including, for example, a CPU (central processing unit) and a memory. Specifically, the control device 110 includes the main control portion 110*a*, a flushing control portion 110*b*, the sheet feeding control portion 110*c*, and a maintenance control portion 110*d*. Needless to say, the control portions constituting the control device 110, which are formed of a single CPU, may also be formed of separate CPUs.

The main control portion 110*a* controls operations of the various portions of the printer 100. For example, driving of the rollers in the printer 100, ejection of the ink from the recording heads 17*a* to 17*c* during image formation (other than during flushing), and so on are controlled by the main control portion 110*a*.

Based on detection of the respective positions of the first openings 80 by the belt sensor 24 or 25, the flushing control portion 110*b* controls the recording heads 17*a* to 17*c* to execute flushing. Such flushing based on detection of the respective positions of the first openings 80 will be described later in detail.

The sheet feeding control portion 110*c* is a recording medium feeding control portion that controls the registration roller pair 13 as a recording medium feeding portion. For example, based on detection of the respective positions of the first openings 80 by the belt sensor 24 or 25, the sheet feeding control portion 110*c* controls the registration roller pair 13. The sheet feeding control portion 110*c* can also control the registration roller pair 13 independently of detection of the respective positions of the first openings 80 by the belt sensor 24 or 25 (regardless of the detection of the respective positions).

The maintenance control portion 110*d* controls the recording heads 17*a* to 17*c* to execute the above-described purging in which the ink is forcibly extruded through the ink ejection ports 18. When the above-described recovery operation of the recording heads 17*a* to 17*c* is executed, the maintenance control portion 110*d* also controls driving of the maintenance unit 19 (for example, so that the maintenance unit 19 moves to below the recording portion 9 and retreats therefrom).

Furthermore, as shown in FIG. 7, the printer 100 includes the ink receivers 31Y, 31M, 31C, and 31K provided on an inner circumferential surface side of the first conveyance belt 8. When flushing is executed by the recording heads 17*a* to 17*c*, the ink receivers 31Y to 31K receive and collect the ink that has been ejected from the recording heads 17*a* to 17*c* and then passed through the first openings 80 of the first conveyance belt 8. Accordingly, the ink receivers 31Y to 31K are each provided at a position opposed, via the first conveyance belt 8, to each of the recording heads 17*a* to 17*c* of a corresponding one of the line heads 11Y to 11K. The ink collected by the ink receivers 31Y to 31K is sent, via an ink discharging flow path 33 (see FIG. 11), to, for example, a waste ink tank (not shown) so as to be discarded.

The second conveyance unit 12 includes a second conveyance belt 12*a* and a dryer 12*b*. The second conveyance belt 12*a* is stretched over two rollers that are a driving roller 12*c* and a driven roller 12*d*. The sheet P that has been conveyed by the first conveyance unit 5 and to which the ink has been ejected by the recording portion 9 so that an image is recorded thereon is conveyed by the second conveyance belt 12*a*, while being dried by the dryer 12*b* during the conveyance, to the above-described decurler portion 14.

2. Details of First Conveyance Belt

Figure 9:
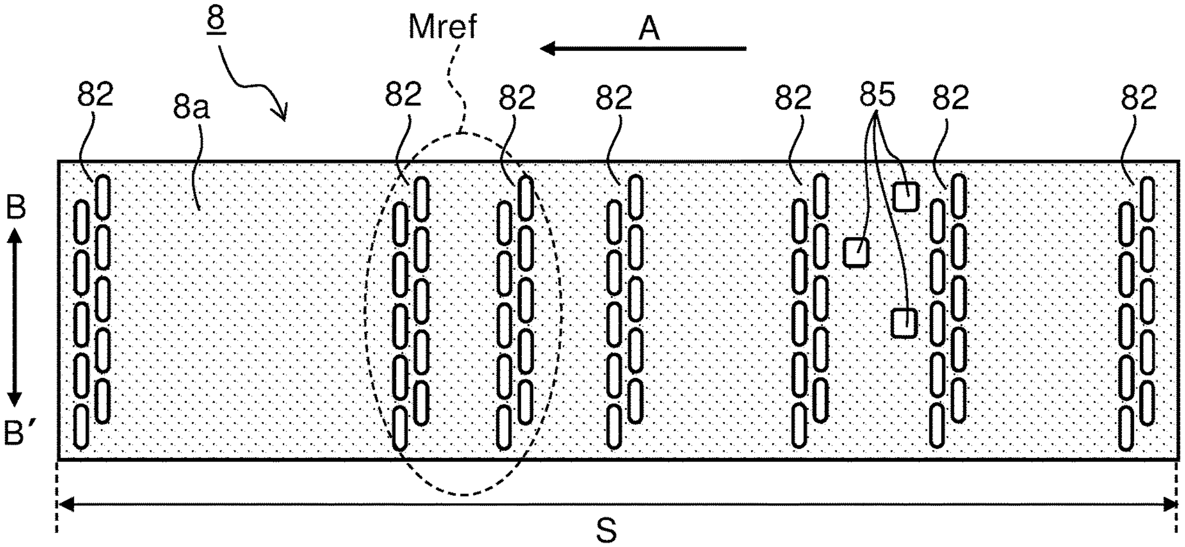
FIG. 9 is a plan view showing a configuration example of a first conveyance belt included in the above-described first conveyance unit.
Figure 10:
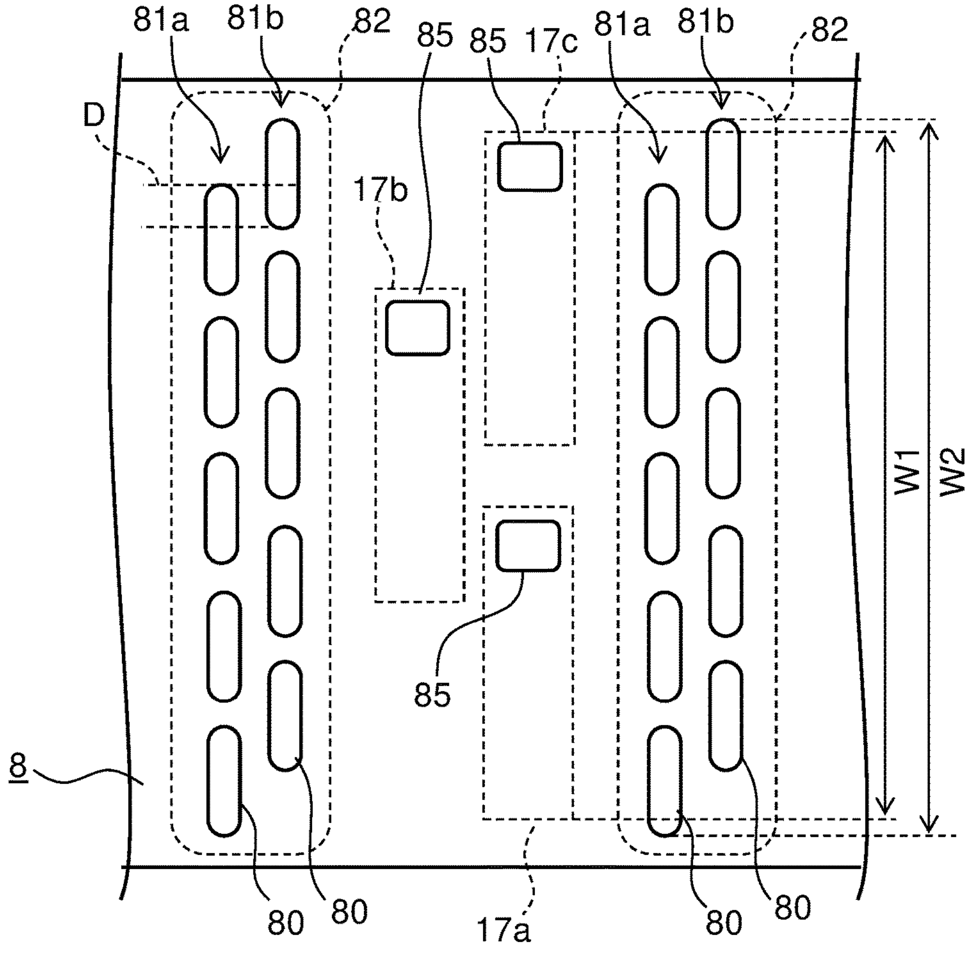
FIG. 10 is a partially enlarged view of a vicinity of second openings of the first conveyance belt shown in FIG. 9.

Next, a description is given of details of the first conveyance belt 8 of the first conveyance unit 5. FIG. 9 is a plan view showing a configuration example of the first conveyance belt 8 used in the printer 100. FIG. 10 is a partially enlarged view of a vicinity of second openings 85 of the first conveyance belt 8 shown in FIG. 9.

This embodiment employs a negative pressure suction method in which the sheet P is conveyed while being absorbed to the first conveyance belt 8 by negative pressure suction. To this end, over an entire region of the first conveyance belt 8, numerous suction holes 8*a* are formed for passing therethrough suction air for causing the sheet P to be absorbed to the first conveyance belt 8 by the negative pressure suction.

The first conveyance belt 8 has the plurality of first openings 80 for passing therethrough the ink ejected through the nozzles (the ink ejection ports 18) of the recording heads 17*a* to 17*c* during flushing. The first openings 80 are holes formed to be elongated in the belt width direction (the arrow B-B' direction). While in this embodiment, when viewed in plan, the first openings 80 have a rectangular shape with rounded corner regions as shown in FIG. 9, they may have a rectangular shape or any other shape (for example, an oval shape).

In this embodiment, the plurality of (herein, within one cycle S of the first conveyance belt 8, seven) opening groups 82 each composed of a plurality of first openings 80 from among the first openings 80 is arranged at prescribed intervals in the sheet conveyance direction (the arrow A direction). The opening groups 82 are each composed of two opening rows 81*a* and 81*b*. In the conveyance direction, the opening groups 82 are formed not at equal intervals but irregularly at respective positions corresponding to a size of the sheet P to be conveyed. That is, in the sheet conveyance direction, intervals between adjacent ones of the opening groups 82 are not constant but vary. At this time, a maximum interval between each pair of adjacent ones of the opening groups 82 in the sheet conveyance direction is longer than a length, in the sheet conveyance direction, of the sheet P of a printable minimum size (for example, an A4 size in landscape orientation) placed on the first conveyance belt 8.

Each of the opening rows 81*a* and 81*b* has a plurality of (herein, five) first openings 80 disposed at equal intervals in the belt width direction (the arrow B-B' direction). When viewed from the conveyance direction for conveying the sheet P (the arrow A direction), each of the first openings 80 of the opening row 81*a* as one of the opening rows 81*a* and 81*b* is disposed so as to overlap a part (a longitudinal end), in the belt width direction, of a corresponding one of the first openings 80 of the opening row 81*b* as the other of the opening rows 81*a* and 81*b* (so as to have an overlapping part D). That is, on the first conveyance belt 8, the plurality of first openings 80 is disposed in a staggered manner. The number of the first openings 80 of the opening row 81*a* may be different from the number of the first openings 80 of the opening row 81*b*.

Here, when a head width of the line heads 11Y to 11K (the recording heads 17*a* to 17*c*) is indicated as W1 (mm), a width W2 (mm) of the opening groups 82 in the belt width direction is larger than W1. As a result, when the recording heads 17*a* to 17*c* execute flushing, the ink ejected through the ink ejection ports 18 of the recording heads 17*a* to 17*c* passes through either the first openings 80 of the opening row 81*a* or the first openings 80 of the opening row 81*b*. Accordingly, the flushing is executed over the entire head width by the recording heads 17*a* to 17*c*, and thus it becomes possible to reduce clogging due to drying of the ink in all the ink ejection ports 18.

In this embodiment, in accordance with a size of the sheet P used, the control device 110 (for example, the flushing control portion 110*b*) determines a pattern (a combination) of, from among the opening groups 82, a plurality of opening groups 82 in the sheet conveyance direction, which is used for flushing in the one cycle S of the first conveyance belt 8. To be more specific, the reference specifying area Mref on the first conveyance belt 8 is read by the belt sensor 24 or 25, and based on positional information on the reference specifying area Mref and size information on the sheet P, a timing for conveying the sheet P from the registration roller pair 13 to the first conveyance belt 8 is caused to vary. Thus, control is performed so that, at a constant cycle, the opening groups 82 are positioned in inter-sheet spaces between the sheets P being continuously conveyed.

Based on information stored in the storage portion 28 (for example, the size information on the sheet P inputted via the operation panel 27), the control device 110 can recognize the size of the sheet P used. A timing for performing the flushing is based on the "inter-sheet spaces" without being limited thereto. For example, the flushing can also be performed before an image is formed on a foremost one of the sheets P or after an image has been formed on a rearmost one of the sheets P.

Furthermore, the first conveyance belt 8 has the second openings 85 provided therein. In one location within the one cycle S of the first conveyance belt 8, three second openings 85 in total are each formed at a position corresponding to the cleaning liquid supply part 60 of each of the three recording heads 17*a* to 17*c* constituting each of the line heads 11Y to 11K.

3. Configuration of Ink Receiver of First Embodiment

Figure 11:
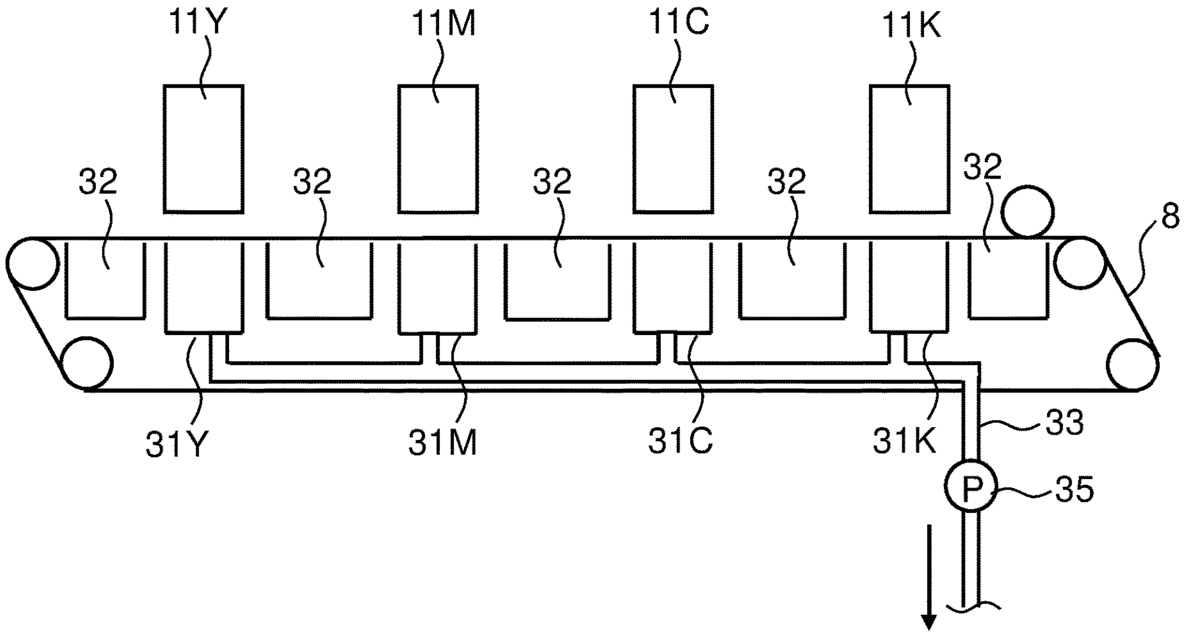
FIG. 11 is a schematic view showing an ink discharging path including ink receivers in a printer according to a first embodiment of the present invention.
Figure 12:
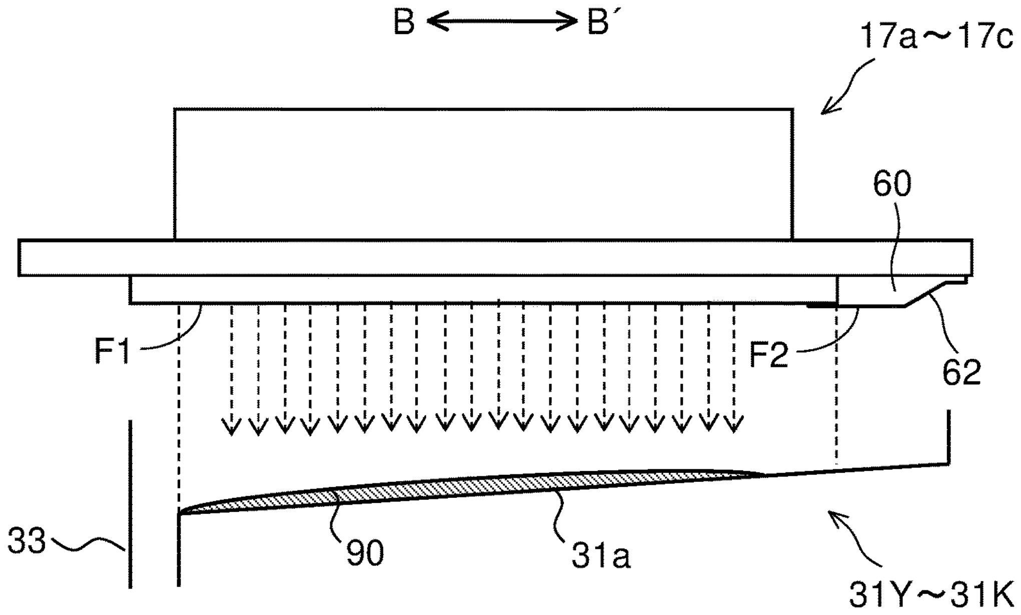
FIG. 12 is a sectional side view showing a configuration of the ink receivers used in the printer of the first embodiment, illustrating a state where ink droplets are ejected into each of the ink receivers.

Next, a description is given of the ink receivers 31Y to 31K in the printer 100 of the present invention. FIG. 11 is a schematic view showing an ink discharging path including ink receivers 31Y to 31K in a printer 100 according to a first embodiment of the present invention. FIG. 12 is a sectional side view showing a configuration of the ink receivers 31Y to 31K used in the printer 100 of the first embodiment. Since the ink receivers 31Y to 31K are similar in configuration, the description is given by using a single ink receiver shown in FIG. 12 as each of the ink receivers 31Y to 31K. Furthermore, in FIG. 12 and after-mentioned FIG. 13 to FIG. 16, depiction of a first conveyance belt 8 is omitted.

The ink receivers 31Y to 31K are disposed immediately below line heads 11Y to 11K via the first conveyance belt 8, respectively. That is, the line heads 11Y to 11K are disposed along an intersecting direction (an arrow B-B' direction), and the ink receivers 31Y to 31K are also disposed along the intersecting direction (the arrow B-B' direction). Furthermore, a plurality of (herein, five) sucking parts 32 for holding a sheet P while absorbing it on the first conveyance belt 8 by negative pressure suction is disposed along an advancing direction of the first conveyance belt 8 so that each of the ink receivers 31Y to 31K is interposed between adjacent ones of the sucking parts 32.

A pipe-shaped ink discharging flow path 33 is connected to bottom surfaces of the ink receivers 31Y to 31K. The ink discharging flow path 33 branches off into partial paths connected to the ink receivers 31Y to 31K, which merge into a single path on a downstream side of the ink receiver 31K in an ink discharging direction. The ink discharging flow path 33 includes a pump 35 provided on a downstream side of the ink receiver 31K.

As shown in FIG. 12, the ink receivers 31Y to 31K are each disposed so as to correspond to each of recording heads 17*a* to 17*c* constituting a corresponding one of the line heads 11Y to 11K. A bottom surface 31*a* of each of the ink receivers 31Y to 31K is inclined in the intersecting direction (the arrow B-B' direction). Specifically, in a sheet width direction, the bottom surface 31*a* has a downward gradient from one end thereof (a right side in FIG. 12) toward the other end thereof (a left side in FIG. 12), and a cleaning liquid supply part 60 of each of the recording heads 17*a* to 17*c* is opposed to the one end of the bottom surface 31*a*. The ink discharging flow path 33 is connected to the other end of the bottom surface 31*a*.

Next, a description is given of control to discharge ink from the ink receivers 31Y to 31K in the printer 100 of this embodiment. Upon a communication portion 29 receiving a printing instruction, based on image data, a main control portion 110*a* controls the recording heads 17*a* to 17*c* to perform image recording on the sheet P. and a flushing control portion 110*b* executes flushing in inter-sheet spaces between the sheets P. Ink droplets ejected as a result of the flushing pass through first openings 80 of the first conveyance belt 8 to be ejected onto the ink receivers 31Y to 31K.

FIG. 12 illustrates a state where the ink droplets are ejected into each of the ink receivers 31Y to 31K, so that there is an accumulation of ink 90 on the bottom surface 31*a* of the each of the ink receivers 31Y to 31K. The ink 90 moves along an inclination of the bottom surface 31*a* and then flows into the ink discharging flow path 33.

Here, when the ink 90 becomes dried to have decreased flowability, the ink 90 becomes unlikely to move along the inclination of the bottom surface 31*a* and thus is deposited in the each of the ink receivers 31Y to 31K. As a result, the ink 90 thus deposited adheres to the first conveyance belt 8, causing the sheet P to be contaminated, or the ink 90 having the decreased flowability flows into the ink discharging flow path 33 and causes clogging thereof, resulting in contamination inside the printer 100 or a breakdown of the printer 100.

To solve this issue, in this embodiment, at every lapse of a given period of time, a cleaning liquid is ejected through cleaning liquid supply ports 60*a* of each of the recording heads 17*a* to 17*c* to the ink receivers 31Y to 31K via second openings 85 of the first conveyance belt 8.

Figure 13:
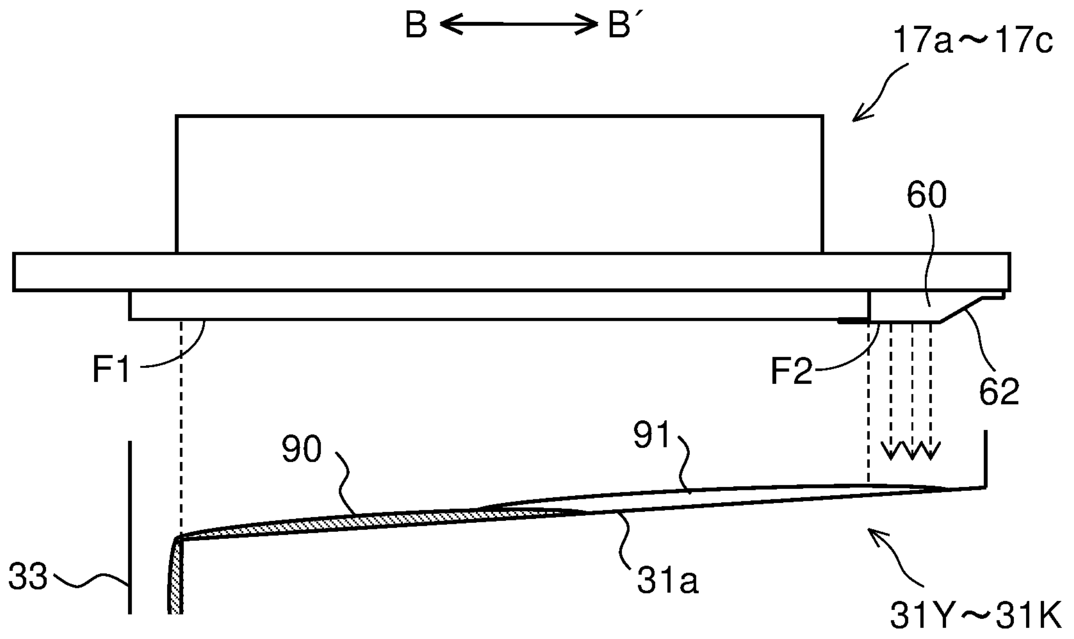
FIG. 13 is a view showing a state where, from the state shown in FIG. 12, a cleaning liquid is ejected to the each of the ink receivers.

FIG. 13 is a view showing a state where, from the state shown in FIG. 12, the cleaning liquid is ejected into the each of the ink receivers 31Y to 31K. As shown in FIG. 13, when a cleaning liquid 91 is ejected from the cleaning liquid supply part 60 at every given period of time, the cleaning liquid 91 thus ejected moves along the inclination of the bottom surface 31*a* of the each of the ink receivers 31Y to 31K, washes away, while dissolving, the ink 90 that has been previously accumulated, and then flows into the ink discharging flow path 33.

After that, the pump 35 is driven to deliver, to a waste ink tank, the ink 90 and the cleaning liquid 91 that have flowed into the ink discharging flow path 33.

The cleaning liquid 91 is ejected, preferably, at a timing before execution of the above-described recovery operation of the recording heads 17*a* to 17*c* for the following reason. That is, when the cleaning liquid 91 is ejected, a cleaning liquid pool is generated on a cleaning liquid supply surface F2 of each of the recording heads 17*a* to 17*c*. When image recording is performed in this state where the liquid pool has been generated, the first conveyance belt 8 or the sheet P might contact the liquid pool, causing adherence of the cleaning liquid to the first conveyance belt 8 or the sheet P.

After the cleaning liquid 91 has been ejected into the ink receivers 31Y to 31K, the recovery operation of the recording heads 17*a* to 17*c* is executed, and thus the cleaning liquid pool generated on the cleaning liquid supply surface F2 can be wiped off. Since the recovery operation of the recording heads 17*a* to 17*c* is executed every time a cumulative number of printed sheets reaches a prescribed number, an operation of ejecting the cleaning liquid 91 into the ink receivers 31Y to 31K can also be executed at every given period of time.

The first conveyance belt 8 shown in FIG. 9 has the three second openings 85 formed therein in one location within the one belt cycle S so as to be opposed to the cleaning liquid supply parts 60 of the recording heads 17*a* to 17*c*. With this configuration, for example, in a case of ejecting the cleaning liquid 91 into the ink receivers 31K opposed to the line head 11K for black, the cleaning liquid 91 is ejected from the recording heads 17*a* to 17*c* of the line head 11K in a state where the first conveyance belt 8 is stopped from rotating so that the second openings 85 are positioned immediately below the line head 11K. After that, the second openings 85 are sequentially moved to immediately below each of the line heads 11C to 11Y, and the cleaning liquid 91 is ejected from the recording heads 17*a* to 17*c* of the each of the line heads 11C to 11Y into corresponding ones of the ink receivers 31C to 31Y.

In a case where the first conveyance belt 8 has three second openings 85 formed therein in each of four locations opposed to the line heads 11Y to 11K, the cleaning liquid 91 can be ejected simultaneously from the recording heads 17*a* to 17*c* of each of the line heads 11Y to 11K in a state where the first conveyance belt 8 is stopped from rotating so that the three second openings 85 are positioned immediately below the each of the line heads 11Y to 11K.

According to this embodiment, from the recording heads 17*a* to 17*c* opposed to corresponding ones of the ink receivers 31Y to 31K via the first conveyance belt 8, the cleaning liquid 91 is supplied to the corresponding ones of the ink receivers 31Y to 31K so that the ink 90 remaining on the bottom surface 31*a* of each of the corresponding ones of the ink receivers 31Y to 31K is washed away, and thus it is possible to efficiently collect ink that has become dried on the corresponding ones of the ink receivers 31Y to 31K and thus has decreased flowability. Accordingly, it is possible to suppress contamination of the sheet P and the first conveyance belt 8 due to deposition of ink on the ink receivers 31Y to 31K and clogging of the ink discharging flow path 33 with solidified ink.

Furthermore, the cleaning liquid supply part 60 for cleaning an ink ejection surface F1 is provided at one end of each of the recording heads 17*a* to 17*c*, and the ink receivers 31Y to 31K are supplied with the cleaning liquid 91 from the cleaning liquid supply part 60. This eliminates the need to separately provide a cleaning liquid supply system for the ink receivers 31Y to 31K, thus making it possible to suppress a size increase and a cost increase of the printer 100.

The cleaning liquid 91 used in the present invention contains water, an organic solvent, a deliquescence agent, a surfactant, a basic compound, and a polyhydric alcohol. The water has a function as a solvent that, together with the organic solvent, dissolves the deliquescence agent. Examples of the water contained in the cleaning liquid 91 include purified water and ion-exchanged water. Examples of the organic solvent include 2-pyrrolidone.

The deliquescence agent has a function of imparting a deliquescent property to a mixture of a cleaning liquid and ink adhering to a nozzle surface of a recording head so as to prevent drying thereof. The cleaning liquid of the present invention contains, as the deliquescence agent, a compound expressed by Chemical Formula (1) below.

[Chemical Formula 1]

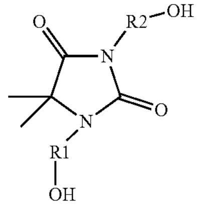

(1)

(In the formula, each of R1 and R2 denotes a methyl group or an ethyl group.)

The surfactant is contained to enhance lubricity between the recording heads 17*a* to 17*c* and a wiper during a recovery process for recovering the recording heads 17*a* to 17*c*. As the surfactant contained in the cleaning liquid 91, preferably, an ampholytic surfactant having a betaine structure is used.

The basic compound has a function of maintaining a pH of the cleaning liquid 91 alkaline so as to enhance dissolvability of an alkali-soluble binder resin contained in aqueous ink. Examples of the basic compound contained in the cleaning liquid 91 include sodium hydroxide or potassium hydroxide, which has strong alkalinity and can be used in a minute amount to adjust the pH.

The polyhydric alcohol is a compound having two or more hydroxyl groups and has a function of enhancing moisture retention of the cleaning liquid 91 so as to suppress drying of the nozzle surface. Examples of the polyhydric alcohol contained in the cleaning liquid 91 include diols, glycols, and glycerin. Table 1 shows a formulation example of the cleaning liquid 91.

TABLE 1

| NAME OF COMPONENT | | BLENDING AMOUNT [mass %] |
|---|---|---|
| Deliquescence Agent | Compound of Formula (1) | 2.0 |
| Ampholytic Surfactant | Cocamidopropyl betaine | 1.0 |
| Polyhydric Alcohol | 1,3-Propanediol | 30 |
| Organic Solvent | Triethylene glycol monobutyl ether | 10 |
| | 2-Pyrrolidone | 10 |
| Basic Compound | 1N Sodium hydroxide aqueous solution | 0.1 |
| Ion-Exchanged Water | | Rest |
| TOTAL | | 100 |

4. Configuration of Ink Receiver of Second Embodiment

Figure 14:
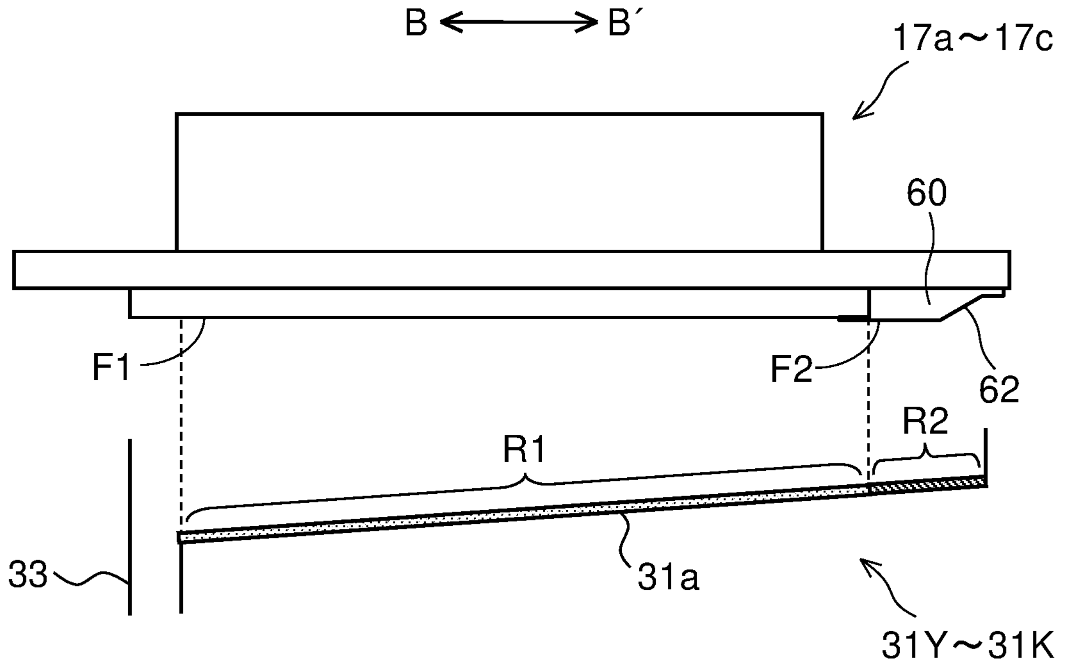
FIG. 14 is a sectional side view showing a configuration of ink receivers used in a printer according to a second embodiment of the present invention.

FIG. 14 is a sectional side view showing a configuration of ink receivers 31Y to 31K used in a printer 100 of a second embodiment. Since the ink receivers 31Y to 31K are similar in configuration, a description thereof is given by using a single ink receiver shown in the figure as each of the ink receivers 31Y to 31K.

In this embodiment, a bottom surface 31*a* of each of the ink receivers 31Y to 31K is divided into a first region R1 opposed to an ink ejection surface F1 of each of recording heads 17*a* to 17*c* and a second region R2 opposed to a cleaning liquid supply part 60 (a cleaning liquid supply surface F2) of the each of the recording heads 17*a* to 17*c*. The second region R2 is made of a material having higher water repellency than that of the first region R1. Other parts in an ink discharging path are similar in configuration to those in the first embodiment.

According to this embodiment, the second region R2 of each of the ink receivers 31Y to 31K opposed to the cleaning liquid supply part 60 is a region where a cleaning liquid 91 supplied through cleaning liquid supply ports 60*a* flows. Since the second region R2 is increased in water repellency, adherence of the cleaning liquid 91 thereto is decreased, and thus the cleaning liquid 91 ejected onto each of the ink receivers 31Y to 31K can efficiently flow to the first region R1, with an amount of a residual part thereof remaining in the second region R2 reduced.

While there is no particular limitation on the material of the second region R2 as long as the material is a resin having high water repellency, a polytetrafluoroethylene resin (PTFE) is preferably used as the material. As an index of the water repellency of the second region R2, preferably, the second region R2 has a contact angle of not less than 110° with respect to water.

The first region R1 opposed to the ink ejection surface F1, on the other hand, is a region reached by ink droplets ejected as a result of flushing. Since the first region R1 is decreased in water repellency, wettability thereof with respect to ink 90 and the cleaning liquid 91 is increased to facilitate spreading, over the entire first region R1, of the cleaning liquid 91 flowing in from the second region R2. It is, therefore, possible to efficiently wash away the ink 90 adhering to the first region R1, thus improving dischargeability of the ink 90 and the cleaning liquid 91 from the ink receivers 31Y to 31K.

While there is no particular limitation on a material of the first region R1 as long as the material is a resin having lower water repellency than that of the second region R2, a polystyrene resin (PS) is preferably used as the material. As an index of the water repellency of the first region R1, preferably, the first region R1 has a contact angle of not more than 85° with respect to water.

5. Configuration of Ink Receiver of Third Embodiment

Figure 15:
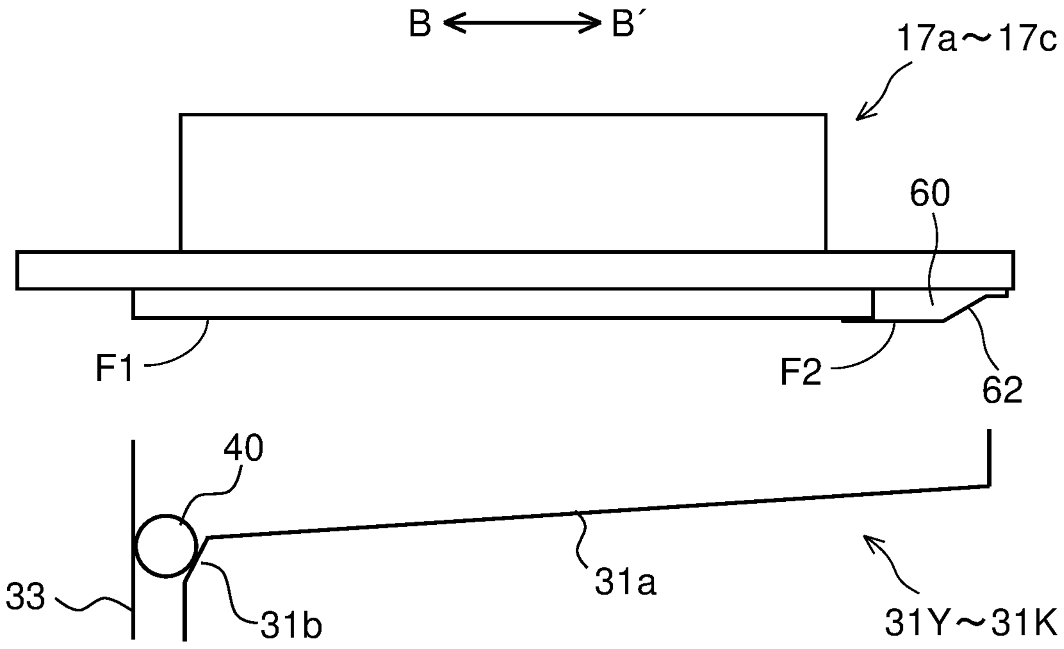
FIG. 15 is a sectional side view showing a configuration of ink receivers used in a printer according to a third embodiment of the present invention, illustrating a state where there are no ink and no cleaning liquid in each of the ink receivers.

FIG. 15 is a sectional side view showing a configuration of ink receivers 31Y to 31K used in a printer 100 of a third embodiment. Since the ink receivers 31Y to 31K are similar in configuration, a description thereof is given by using a single ink receiver shown in the figure as each of the ink receivers 31Y to 31K.

In this embodiment, a spherical floating member 40 is provided in each of the ink receivers 31Y to 31K. Furthermore, a bottom surface of each of the ink receivers 31Y to 31K includes a connection part 31*b* formed therein, to which an ink discharging flow path 33 is connected. Other parts of each of the ink receivers 31Y to 31K are similar in configuration to those in the first embodiment.

The floating member 40 is made of a material having a smaller specific gravity than those of ink 90 and a cleaning liquid 91 retained in the ink receivers 31Y to 31K. The connection part 31*b* has an inversely tapered shape whose diameter is decreased from an upstream side toward a downstream side (in a top-to-bottom direction in FIG. 15) in a discharging direction of the ink 90 and the cleaning liquid 91. A boundary part (a large-diameter part) between the connection part 31*b* and the bottom surface of each of the ink receivers 31Y to 31K has an inner diameter larger than a diameter of the floating member 40, and a boundary part between the connection part 31*b* and the ink discharging flow path 33 has an inner diameter smaller than the diameter of the floating member 40.

FIG. 15 is a view illustrating a state where there are no ink 90 and no cleaning liquid 91 in each of the ink receivers 31Y to 31K. In a case where there are no ink 90 and no cleaning liquid 91 in each of the ink receivers 31Y to 31K, the floating member 40 contacts the connection part 31*b* of the each of the ink receivers 31Y to 31K so as to close the ink discharging flow path 33.

Figure 16:
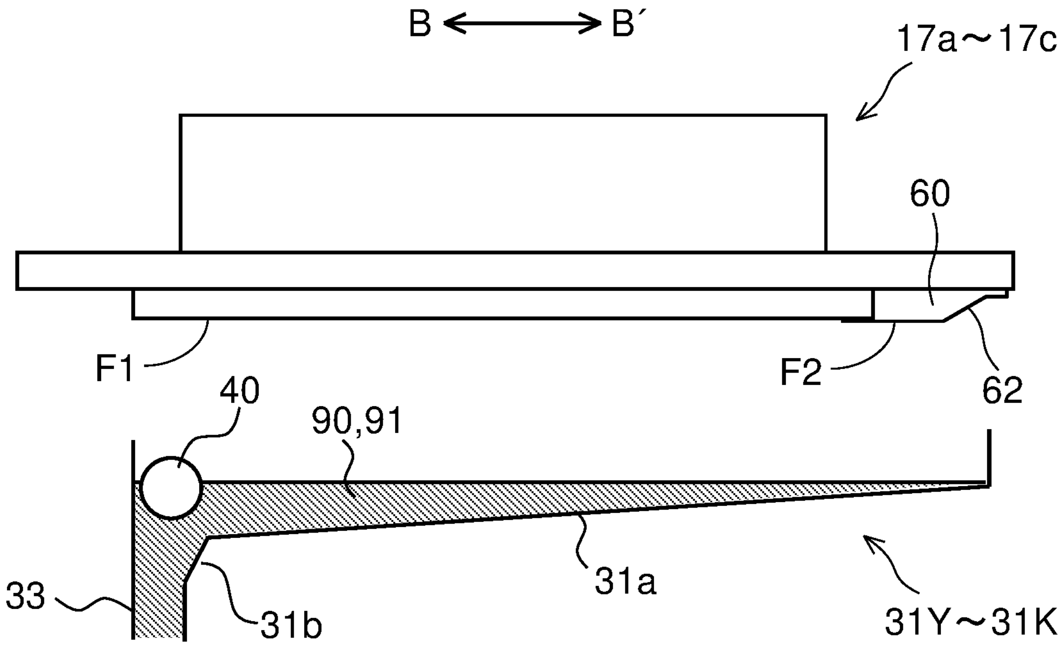
FIG. 16 is a sectional side view showing the configuration of the ink receivers used in the printer of the third embodiment, illustrating a state where ink and a cleaning liquid have been ejected in respective given amounts into each of the ink receivers.

FIG. 16 illustrates a state where, from the state shown in FIG. 15, the ink 90 and the cleaning liquid 91 have been ejected in respective given amounts into each of the ink receivers 31Y to 31K, in which the floating member 40 is floating in the ink 90 and the cleaning liquid 91. In this state, each of the ink receivers 31Y to 31K communicates with the ink discharging flow path 33, and thus it is possible, by driving a pump 35, to discharge the ink 90 and the cleaning liquid 91 in the each of the ink receivers 31Y to 31K.

Figure 17:
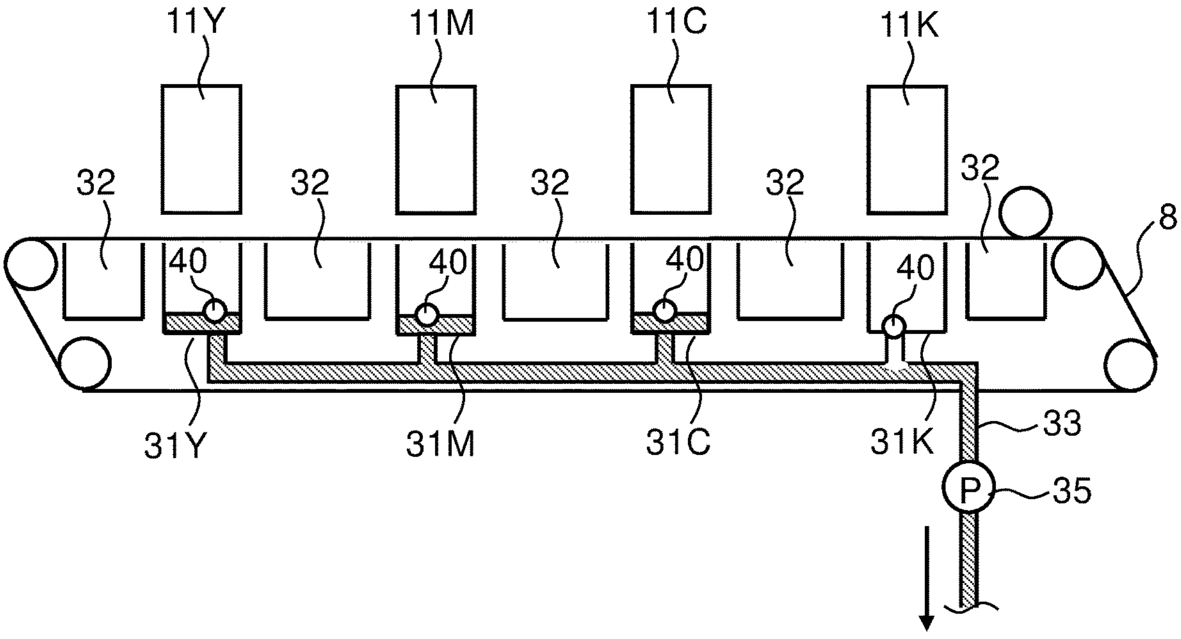
FIG. 17 is a schematic view showing an ink discharging path including the ink receivers in the printer of the third embodiment.

FIG. 17 is a schematic view showing an ink discharging path including the ink receivers 31Y to 31K in the printer 100 of the third embodiment. With the floating member 40 provided in each of the ink receivers 31Y to 31K, for example, when any one (the ink receiver 31K in FIG. 17) of the ink receivers 31Y to 31K becomes empty, the floating member 40 in the emptied one of the ink receivers 31Y to 31K closes the ink discharging flow path 33.

With this configuration, when the pump 35 is driven, air is no longer sucked through a partial path of the ink discharging flow path 33 connected to the emptied one of the ink receivers 31Y to 31K, and thus it is possible to smoothly discharge the ink 90 and the cleaning liquid 91 from the others of the ink receivers 31Y to 31K (the ink receivers 31Y to 31C in FIG. 17) via the ink discharging flow path 33.

6. Others

The present invention is not limited to the foregoing embodiments and can be variously modified without departing from the spirit of the present invention. For example, while the foregoing embodiments describe the configuration in which the cleaning liquid is supplied from the cleaning liquid supply part 60 provided in each of the recording heads 17*a* to 17*c* to a corresponding one of the ink receivers 31Y to 31K via the second openings 85 of the first conveyance belt 8, a configuration may also be adopted in which, without the use of the cleaning liquid supply part 60 of each of the recording heads 17*a* to 17*c*, a supply path connecting the ink receivers 31Y to 31K to a tank containing the cleaning liquid is provided so that the cleaning liquid is directly supplied from the tank to the ink receivers 31Y to 31K. Furthermore, a liquid supplied to the ink receivers 31Y to 31K is not limited to the cleaning liquid as long as the liquid is capable of dissolving ink, and a liquid other than the cleaning liquid may be supplied thereto.

Furthermore, while the foregoing embodiments describe the case where the sheet P is conveyed while being absorbed to the first conveyance belt 8 by negative pressure suction using the sucking parts 32, a configuration may also be adopted in which the first conveyance belt 8 is charged so that the sheet P is conveyed while being absorbed to the first conveyance belt 8 by electrostatic absorption (an electrostatic absorption method).

Furthermore, while the foregoing embodiments describe the configuration using the first conveyance belt 8 having the opening groups 82 each composed of the plurality of first openings 80 are disposed irregularly at respective positions corresponding to a sheet size in the sheet conveyance direction (the arrow A direction), there can also be used the first conveyance belt 8 having the opening groups 82 arranged at constant intervals over an entire surface thereof.

Furthermore, while the foregoing embodiments describe the example using, as an inkjet recording apparatus, a color printer that uses ink of four different colors to record a color image, the ink discharging paths of the embodiments of the present invention can be used also in a case of using a monochrome printer that uses black ink to record a monochrome image.

INDUSTRIAL APPLICABILITY

The present invention is usable in an inkjet recording apparatus such as an inkjet printer.

The invention claimed is:

1. An inkjet recording apparatus, comprising:

a recording head including a plurality of nozzles for ejecting ink;

a conveyance belt that has a plurality of first openings and conveys a recording medium;

a control portion that controls driving of the recording head and the conveyance belt so as to execute flushing in which, at a timing different from a timing contributing to image recording, the ink is ejected through the nozzles of the recording head to pass through any of the plurality of first openings;

an ink receiver that is disposed to be opposed to the recording head via the conveyance belt and receives the ink that has passed through the first openings during execution of the flushing;

an ink discharging flow path connected to the ink receiver; and a liquid supply mechanism that supplies a liquid capable of dissolving the ink into the ink receiver; wherein the recording head includes a cleaning liquid supply part that ejects a cleaning liquid to be supplied to and used for cleaning a nozzle surface of the recording head in which the nozzles are open, the conveyance belt has a second opening for the cleaning liquid ejected from the cleaning liquid supply part to pass through, and the liquid supply mechanism corresponds to the cleaning liquid supply part that supplies, as the liquid, the cleaning liquid into the ink receiver via the second opening.

2. The inkjet recording apparatus according to claim 1, wherein the recording head comprises a plurality of recording heads, the plurality of recording heads ejecting the ink of different colors and being disposed at different positions in a conveyance direction for conveying the recording medium, the second opening is formed in one location on the conveyance belt in the conveyance direction, and with respect to each of the plurality of recording heads, the control portion sequentially performs an operation in which the cleaning liquid is ejected from the cleaning liquid supply part in a state where the conveyance belt is stopped from rotating so that the second opening is at a position opposed to the cleaning liquid supply part of the each of the plurality of recording heads.

3. The inkjet recording apparatus according to claim 1, wherein the recording head comprises a plurality of recording heads, the plurality of recording heads ejecting the ink of different colors and being disposed at different positions in a conveyance direction for conveying the recording medium, the second opening comprises a plurality of second openings, the plurality of second openings being formed in plural locations on the conveyance belt in the conveyance direction so as to correspond to the plurality of recording heads, and the control portion performs control in which the cleaning liquid is ejected simultaneously from the cleaning liquid supply part of each of the plurality of recording heads in a state where the conveyance belt is stopped from rotating so that the plurality of second openings is each at a position opposed to the cleaning liquid supply part of each of the plurality of recording heads.

4. The inkjet recording apparatus according to claim 1, wherein the cleaning liquid supply part is provided at one end of the recording head in an intersecting direction intersecting a conveyance direction for conveying the recording medium, and a bottom surface of the ink receiver has a downward gradient from one end thereof opposed to the cleaning liquid supply part toward another end thereof in the intersecting direction, and the ink discharging flow path is connected to the other end of the bottom surface.

5. The inkjet recording apparatus according to claim 4, wherein the bottom surface of the ink receiver includes a first region opposed to the nozzle surface and a second region opposed to the cleaning liquid supply part, and the second region has higher water repellency than that of the first region.

6. The inkjet recording apparatus according to claim 1, wherein the control portion is capable of executing a recovery operation of the recording head in which, after the ink has been forcibly discharged through all the nozzles of the recording head to the nozzle surface, the ink is wiped off together with the cleaning liquid supplied through supply ports for supplying the cleaning liquid, and before executing the recovery operation, the control portion supplies the cleaning liquid into the ink receiver via the second opening.

7. The inkjet recording apparatus according to claim 1, further comprising:

a pump that discharges the ink and the liquid in the ink receiver via the ink discharging flow path; and a floating member that is provided in the ink receiver and has a smaller specific gravity than those of the ink and the liquid, wherein when the ink and the liquid are present in the ink receiver, the floating member opens a connection part of the ink receiver between itself and the ink discharging flow path, and when the ink and the liquid in the ink receiver have been completely discharged, the floating member closes the connection part.

* * * * *